(12) United States Patent
Kerth

(10) Patent No.: US 10,724,430 B2
(45) Date of Patent: Jul. 28, 2020

(54) PUMPED HEAT ENERGY STORAGE SYSTEM

(71) Applicant: Dresser-Rand Company, Olean, NY (US)

(72) Inventor: Jason M. Kerth, Houston, TX (US)

(73) Assignee: DRESSER-RAND COMPANY, Olean, NY (US)

( * ) Notice: Subject to any disclaimer, the term of this patent is extended or adjusted under 35 U.S.C. 154(b) by 0 days.

(21) Appl. No.: 16/611,654

(22) PCT Filed: Jun. 1, 2018

(86) PCT No.: PCT/US2018/035526
§ 371 (c)(1),
(2) Date: Nov. 7, 2019

(87) PCT Pub. No.: WO2019/013898
PCT Pub. Date: Jan. 17, 2019

(65) Prior Publication Data
US 2020/0165967 A1 May 28, 2020

Related U.S. Application Data

(60) Provisional application No. 62/530,571, filed on Jul. 10, 2017.

(51) Int. Cl.
*F02C 1/10* (2006.01)
*F02C 6/14* (2006.01)
*F28D 20/00* (2006.01)

(52) U.S. Cl.
CPC ............... *F02C 1/10* (2013.01); *F02C 6/14* (2013.01); *F05D 2260/213* (2013.01);
(Continued)

(58) Field of Classification Search
CPC ...... F02C 1/10; F02C 6/14; F28D 2020/0078; F28D 2020/0082; F28D 20/0056; F05D 2260/213
(Continued)

(56) References Cited

U.S. PATENT DOCUMENTS 9,394,807 B1 * 7/2016 Kreuger ............... F01K 1/12
2008/0000233 A1 * 1/2008 Althaus ............... F01D 19/02
60/659

(Continued)

FOREIGN PATENT DOCUMENTS

EP 2687702 A1 1/2014
EP 3255265 A1 12/2017
(Continued)

OTHER PUBLICATIONS

PCT International Search Report and Written Opinion dated Oct. 10, 2018 corresponding to PCT Application No. PCT/US2018/035526 filed Jun. 1, 2018.

*Primary Examiner* — Hoang M Nguyen

(57) ABSTRACT

A pumped heat energy storage (PHES) system (100) including a charging circuit and a discharging circuit effective to balance or split a total heat rejection of the PHES system between the charging circuit and the discharging circuit. The charging circuit may include thermal storage vessels (102, 104) to store thermal energy generated from a first compressor (110). A first heat rejection system (128) is fluidly coupled with the thermal storage vessels to remove thermal energy from the charging circuit. The discharging circuit may include a first turbine (146) fluidly coupled with the thermal storage vessels to extract thermal energy stored in the thermal storage vessels and convert the thermal energy to mechanical energy via an expansion of a second working fluid. A second heat rejection system (156) is fluidly coupled
(Continued)

with the thermal storage vessels and the first turbine to remove thermal energy from the discharging circuit.

20 Claims, 1 Drawing Sheet

(52) U.S. Cl.
CPC .. *F28D 20/0056* (2013.01); *F28D 2020/0078* (2013.01); *F28D 2020/0082* (2013.01)

(58) Field of Classification Search
USPC .................................. 60/650, 659, 682–684
See application file for complete search history.

(56) References Cited

U.S. PATENT DOCUMENTS

| | | | |
|---|---|---|---|
| 2010/0218500 A1* | 9/2010 | Ruer | ................... F28D 20/0056 60/659 |
| 2015/0069758 A1* | 3/2015 | Davidson | ................ F25B 25/00 290/52 |
| 2017/0159500 A1 | 6/2017 | Laughlin et al. | |
| 2018/0187595 A1* | 7/2018 | Apte | ....................... F02C 1/105 |

FOREIGN PATENT DOCUMENTS

| | | |
|---|---|---|
| GB | 2501685 A | 11/2013 |
| WO | 2011053411 A1 | 5/2011 |

\* cited by examiner

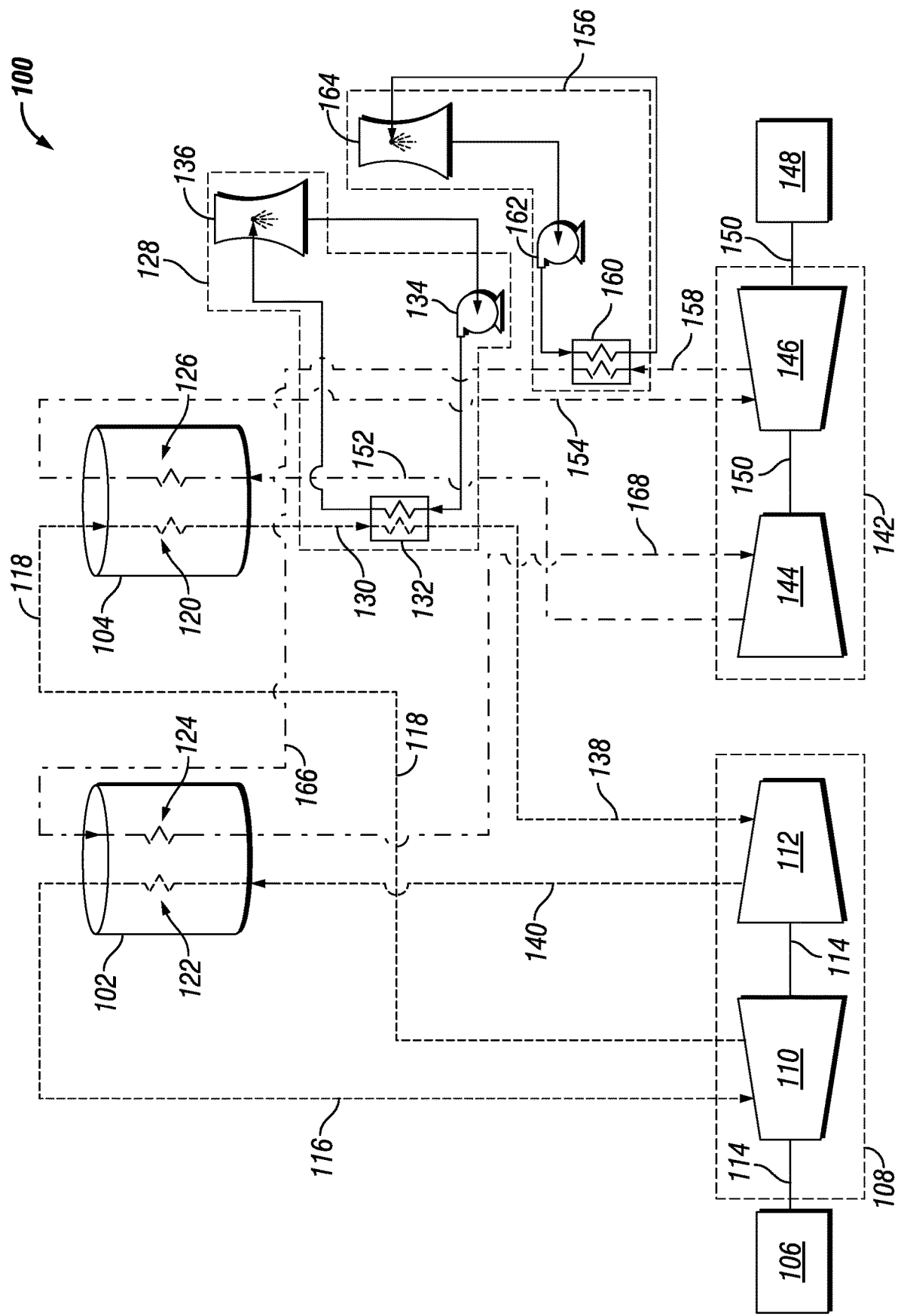

US 10,724,430 B2

PUMPED HEAT ENERGY STORAGE SYSTEM

This application claims benefit of the Jul. 10, 2017 filing date of U.S. provisional patent application 62/530,571, which is incorporated by reference herein.

BACKGROUND

Generally, pumped heat and energy storage (PHES) systems store electrical energy in the form of heat or thermal energy and subsequently generate electrical energy from the stored heat energy. Typically, in a conventional PHES system, a motor may utilize electrical energy to drive a heat pump cycle. The heat pump cycle may move thermal energy from a cold thermal storage reservoir to a hot thermal storage reservoir to thereby store the thermal energy. When desired, a heat engine cycle may be utilized to extract and convert the stored thermal energy to produce mechanical energy, which may be utilized to generate electrical energy. EP 3 255 265 A1 describes one example of a PHES system involving a conveyable solid thermal storage media. For readers interested in general background information regarding PHES systems, see Ph. D dissertation titled "Analysis and Optimisation of Thermal Energy Storage" by Joshua McTigue, St. Catharine's College, University of Cambridge, September 2016.

BRIEF DESCRIPTION

Embodiments of the disclosure may provide a pumped heat energy storage system. The pumped heat energy storage system may include a charging circuit and a discharging circuit. The charging circuit may include a first compressor, a plurality of thermal storage vessels, and a first heat rejection system. The first compressor may be configured to compress a first working fluid and generate thermal energy. The plurality of thermal storage vessels may be fluidly coupled with the first compressor and configured to store the thermal energy generated from the first compressor. The first heat rejection system may be fluidly coupled with the plurality of thermal storage vessels and configured to remove thermal energy from the charging circuit. The discharging circuit may include a first turbine, a generator, and a second heat rejection system. The first turbine may be fluidly coupled with the plurality of thermal storage vessels and configured to extract the thermal energy stored in the plurality of thermal storage vessels and convert the thermal energy to mechanical energy via an expansion of a second working fluid. The generator may be operatively coupled to the first turbine and configured to convert the mechanical energy to electrical energy. The second heat rejection system may be fluidly coupled with the plurality of thermal storage vessels and the first turbine and configured to remove thermal energy from the discharging circuit. The first heat rejection system and the second heat rejection system are configured to balance a total heat rejection of the pumped heat energy storage system between the charging circuit and the discharging circuit.

Embodiments of the disclosure may further provide a pumped heat energy storage system. The pumped heat energy storage system may include an electric motor, a first closed loop, a second closed loop, and a generator. The electric motor may be configured to be driven by an electrical power supply. The first closed loop may be configured to circulate a first working fluid, and the second closed loop may be configured to circulate a second working fluid. The first closed loop may include a first rotary component, a plurality of thermal storage vessels, and a first heat exchanger. The first rotary component may be operatively coupled to the electric motor and configured to generate a thermal energy of the first working fluid. The plurality of thermal storage vessels may be configured to receive the first working fluid and to store the thermal energy generated. The first heat exchanger may be configured to receive the first working fluid from a first thermal storage vessel of the plurality of thermal storage vessels and to remove thermal energy from the first working fluid and the first closed loop. The second closed loop may include a first expansion element and a second heat exchanger. The first expansion element may be fluidly coupled to the first thermal storage vessel and configured to extract the thermal energy stored therein via the second working fluid and to convert the extracted thermal energy to mechanical energy. The second heat exchanger may be configured to receive the second working fluid discharged from the first expansion element and to remove thermal energy from the second working fluid and the second closed loop. The generator may be operatively coupled to the first expansion element and configured to convert at least a portion of the mechanical energy to electrical energy. The first heat exchanger and the second heat exchanger are configured to balance a total heat rejection of the pumped heat energy storage system between the first closed loop and the second closed loop.

Embodiments of the disclosure may further provide a pumped heat energy storage system. The pumped heat energy storage system may include a first working fluid circuit and a second working fluid circuit. The first working fluid circuit may include an electric motor, a heat pump, a thermal storage system, and a first heat rejection system. The heat pump may be configured to be driven by the electric motor and to generate thermal energy. The thermal storage system may be configured to receive the thermal energy generated from the heat pump via a working fluid and to store the thermal energy. The first heat rejection system may be fluidly coupled with the thermal storage system and configured to remove thermal energy from the first working fluid circuit. The second working fluid circuit may include a heat engine, a generator, and a second heat rejection system. The heat engine may be configured to extract thermal energy from the thermal storage system and to convert at least a portion of the thermal energy extracted from the thermal storage system to mechanical energy. The generator may be configured to convert at least a portion of the mechanical energy to electrical energy. The second heat rejection system may be fluidly coupled with the thermal storage system and configured to remove thermal energy from the second working fluid circuit. The first heat rejection system and the second heat rejection system are configured to balance a total heat rejection of the pumped heat energy storage system between the first working fluid circuit and the second working fluid circuit.

BRIEF DESCRIPTION OF THE DRAWINGS

The present disclosure is best understood from the following detailed description when read with the accompanying FIGURE/s. It is emphasized that, in accordance with standard practice, various features are not drawn to scale. In fact, the dimensions of the various features may be arbitrarily increased or reduced for clarity of discussion.

The FIGURE illustrates a process flow diagram in connection with a non-limiting pumped heat energy storage (PHES) system that may benefit from disclosed concepts for balancing or splitting a total heat rejection between the charging circuit and the discharging circuit of the PHES system.

DETAILED DESCRIPTION

The inventor of the present invention has recognized some practical limitations of a heat rejection system arrangement typically utilized in conventional PHES systems. More specifically, in a typical arrangement, a heat rejection system may be provided just in the heat pump cycle, or just in the heat engine cycle. However, locating the heat rejection system just in the heat pump cycle or just in the heat engine cycle gives rise to the respective cycles operating at somewhat different pressure ratios to maintain the necessary temperatures to load and unload the thermal storage reservoirs.

Operating the heat pump cycle and heat engine cycle with different pressure ratios in turn can give rise to operation inefficiencies in the PHES system. For instance, while an ideal gas has specific heat that is independent of pressure (e.g., dependent just on temperature), all real gases have certain specific heat dependence on pressure. Accordingly, operating the process machinery components with different working fluid pressures in the heat pump cycle and the heat engine cycle results in the heat transfer versus temperature characteristic being slightly dissimilar between the cycles. This in turn leads to higher temperature differentials required for heat transfer (e.g., conceptually similar to heat exchanger "pinching"), which in turn reduces the achievable overall efficiency of the PHES system.

In view of such recognition, the present inventor proposes an innovative technical solution effective for balancing or splitting a total heat rejection between the charging circuit and the discharging circuit of the PHES system and achieving at least the advantages set forth below. Firstly, the respective pressure ratios at which the charging and discharging cycles operate can be brought relatively closer to one another, leading to matching of the operating pressures between the charging and discharging systems. This in turn leads to practically identical heat transfer versus temperature characteristic between charging and discharging segments, which in turn reduces the necessary temperature differentials in the heat transfer process, which then leads to a maximum overall cycle efficiency. Second, by splitting heat rejection between the respective charging and discharging cycles, the size of the heat rejection system (e.g. cooling tower, cooling water pumps, etc.) can be effectively reduced.

If concurrent operation of the charging and discharging systems is not involved, without limitation, the size of the system may only be half the size than otherwise would be the case. One likely scenario is that one segment (e.g. charging) may operate at full load while the other segment (e.g., discharging) may operate at part load, and in such scenario the system size may, without limitation, be in range from approximately 50% to approximately 100% of the size that otherwise would be, if the heat rejection were taken only from one segment of the system. Such operation allows the PHES system to provide valuable ancillary services products.

Disclosed heat rejection system arrangements may be tailored based on the needs of a given application, such as the strategy of the designer with regard to the sizing of the charging and discharging circuits and/or the operating strategy for the PHES system. Accordingly, the embodiment illustrated in the FIGURE to be described below should not be construed in a limiting sense. More particularly, it should be appreciated that the disclosed broad concept of balancing the total heat rejection between the respective charging and discharging circuits is not contingent on any specific implementation of the PHES system. That is, disclosed concepts of balancing the total heat rejection between the respective charging and discharging circuits could be applied to any PHES system regardless of the specific choice of thermal store, heat exchange, or cycle selection.

It is to be understood that the following disclosure describes several exemplary embodiments comprising different features, structures, or functions of the disclosed embodiments. Exemplary embodiments of components, arrangements, and configurations are described below to simplify the present disclosure; however, these exemplary embodiments are provided merely as examples and are not intended to limit the scope of the disclosed embodiments. Additionally, the present disclosure may repeat reference numerals and/or letters in the various exemplary embodiments and across the FIGURE/s provided herein. This repetition is for the purpose of simplicity and clarity and does not in itself dictate a relationship between the various exemplary embodiments and/or configurations discussed in the various FIGURES. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the disclosed embodiments, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

The FIGURE illustrates a process flow diagram of a non-limiting pumped heat energy storage (PHES) system 100 that may benefit from disclosed concepts for balancing or splitting a total heat rejection between the charging circuit and the discharging circuit of the PHES system. The PHES system 100 may include a plurality of working fluid circuits forming respective closed loops configured to circulate respective working fluids therethrough. For example, as illustrated in the FIGURE, the PHES system 100 may include a first working fluid circuit, referred to herein as a charging circuit (indicated by the " - - - " line), configured to circulate a first working fluid therethrough, and a second working fluid circuit, referred to herein as a discharging circuit (indicated by the "-.-.-" line), configured to circulate a second working fluid therethrough. In the non-limiting embodiment shown in the FIGURE, each of the first working fluid and the second working fluid may be or include argon; however, the present disclosure is not limited thereto, and in another non-limiting embodiment, each of the first working fluid and the second working fluid may be or include nitrogen or any other working fluid known in the art suitable for use in the working fluid circuits disclosed herein.

It will be appreciated that the foregoing respective line indications of a charging circuit and a discharging circuit should not be construed in a limiting sense since in certain applications the respective functionality provided by such circuits could overlap with one another, and consequently the respective line indications shown in the FIGURE do not constitute rigid lines of demarcation for the charging circuit and the discharging circuit, and instead such lines should be flexibly construed as visual hints to facilitate a conceptual understanding of disclosed embodiments.

As will be further described herein, the PHES system 100 may be configured to circulate the first working fluid through the charging circuit to generate heat or thermal energy, store the thermal energy in a plurality of thermal storage vessels 102, 104 forming in part a thermal storage system, extract the thermal energy from the thermal storage vessels 102, 104, and convert the thermal energy stored in the thermal storage vessels 102, 104 to electrical energy via the second working fluid in the discharging circuit. To that end, the charging circuit may include a driver 106 electrically coupled to a power source (not shown), such as, for example, an electrical power grid. The driver 106 may be or include an electric motor, such as a permanent magnet motor, and may include a stator (not shown) and a rotor (not shown). It will be appreciated, however, that other embodiments may employ other types of electric motors including, but not limited to, synchronous motors, induction motors, and brushed DC motors.

The driver 106 may be operatively coupled to and configured to drive a heat pump 108 of the charging circuit. The heat pump 108 may include a rotary component, such as, for example, a compressor 110, and an expansion element, such as, for example, a turbine 112. The driver 106 may be operatively coupled to the compressor 110 and the turbine 112 via a common shaft 114 as illustrated in the FIGURE, or in other embodiments, may be operatively coupled with the compressor 110 and the turbine 112 via respective shafts. In embodiments including multiple shafts, two or more of the shafts may be coupled with one another via a gearbox (not shown) including a plurality of gears, such that the coupled shafts may spin at the same speed, substantially similar speeds, or differing speeds and rotational directions. In at least one embodiment, the heat pump 108 may include a second compressor (not shown) where the compressors may be in series or parallel arrangement to balance the power of the turbine 112.

As arranged in the charging circuit, the compressor 110 may transmit or "pump" thermal energy in the first working fluid from a thermal storage vessel 102 (which may be referred to herein as "a low temperature storage vessel") of the plurality of thermal storage vessels 102, 104 to a thermal storage vessel 104 (which may be referred to herein as "a high temperature storage vessel") of the plurality of thermal storage vessels 102, 104. The compressor 110 may be configured to utilize mechanical energy from the driver 106 and/or the turbine 112 to compress the first working fluid received from the thermal storage vessel 102 via line 116 to increase the pressure and thermal energy or heat (e.g., heat of compression) of the first working fluid provided from the thermal storage vessel 102. The compressor 110 may be further configured to discharge the first working fluid having an increased thermal energy to the thermal storage vessel 104 via line 118.

Each of the thermal storage vessels 102, 104 of the thermal storage system may be configured to contain and store particulate media. For example, the thermal storage vessel 104, referred to herein as the high temperature storage vessel, may be configured to contain and store particulate media at a temperature greater than particulate material contained and stored in the thermal storage vessel 102, referred to herein as the low temperature thermal storage vessel. The thermal storage system may also include a plurality of heat exchangers (four are shown 120, 122, 124, 126), each thermally coupled with one of the thermal storage vessels 102, 104, and configured to heat or cool the particulate media stored in the respective thermal storage vessels 102, 104. For example, in the charging circuit, heat exchanger 120 may be thermally coupled with the thermal storage vessel 104 and configured to heat the particulate media contained therein, and heat exchanger 122 may be thermally coupled with the thermal storage vessel 102 and may be configured to cool the particulate media contained therein. In addition, as shown in the FIGURE and discussed in further detail below, the discharging circuit may include heat exchangers 124 and 126 thermally coupled with respective thermal storage vessels 102 and 104, where heat exchanger 124 may be configured to heat the particulate media contained in thermal storage vessel 102 and heat exchanger 126 may be configured to cool the particulate media contained in thermal storage vessel 104.

The heat exchangers 120, 122, 124, 126 may be or include any device capable of at least partially transferring thermal energy between the working fluid and the particulate media. Each of the heat exchangers 120, 122, 124, 126 may be without limitation a solid-gas heat exchanger configured to transfer thermal energy between the working fluid (e.g., the gas) and the particulate media (e.g., the solid). For example, each of the heat exchangers 120, 122, 124, 126 may be solid-gas heat exchangers configured to transfer thermal energy between particulate media contained in the thermal storage vessels and the working fluid flowing through the charging circuit and/or the discharging circuit. In one or more embodiments, the solid-gas heat exchangers 120, 122, 124, 126 may be configured to indirectly transfer thermal energy between the working fluid and the particulate media. Accordingly, the working fluid and the particulate media in the PHES system 100 may not directly contact one another to transfer thermal energy therebetween. Additionally, as noted above, each of the charging circuit and the discharging circuit may be referred to as closed cycles or circuits. Further, a pressure of the working fluid contained in the charging circuit and/or the discharging circuit may be different than a pressure of the thermal storage system.

The particulate media disposed in the thermal storage system may be fixed therein or conveyable between the thermal storage vessels 102, 104. The particulate media may be or include any material capable of transferring and receiving thermal energy to and from the working fluid via the heat exchangers 120, 122, 124, 126. For example, the particulate media may be or include one or more solid particles and/or fibers suitable for indirectly transferring thermal energy with the working fluid via one or more of the heat exchangers 120, 122, 124, 126. The particulate media may also be or include refractory materials suitable for indirectly transferring thermal energy with the working fluid via one or more of the heat exchangers 120, 122, 124, 126. In at least one non-limiting embodiment, the particulate media may have a low thermal inertia. For example, the particulate media may be or include a metallic material (e.g., metal filings). In another embodiment, the particulate media may be or include a mineral or ceramic (e.g., silica, ceramics, etc.). As previously discussed, the thermal storage system may include a plurality of thermal storage vessels 102, 104. In such an embodiment, each of the thermal storage vessels 102, 104 may contain the same or different particulate media.

In addition to or in place of the particulate media, each of the thermal storage vessels 102, 104 may include a solid mass of concrete or other poured-in-place non-structural thermal material or a series of such masses though which a series of conduits or channels may convey the working fluid to transfer thermal energy therewith. In another embodiment, a secondary fluid may be employed to transfer thermal energy between the working fluid and thermal media, including particulate media, in each of the thermal storage vessels 102, 104. Further, in at least one embodiment, each of the thermal storage vessels 102, 104 may provide for direct thermal energy transfer via a packed bed of solid media over which the working fluid may flow. The solid media may be formed as a structured bed of solid media having a specific optimized shape to enhance desirable properties, such as low pressure drop, high heat capacity per unit volume, high heat conductance across a section and low heat conduction in the longitudinal direction.

As shown in the FIGURE, the charging circuit may also include a heat rejection system 128 disposed upstream of and fluidly coupled with the turbine 112 and downstream from and fluidly coupled with the thermal storage vessel 104. Accordingly, the heat rejection system 128 may be configured to receive the first working fluid discharged from the thermal storage vessel via line 130. The heat rejection system 128 may include a heat exchanger 132, a pump 134, and a cooling fluid source, such as, for example, a cooling tower 136, fluidly coupled with one another via a cooling fluid. For example, as illustrated in the FIGURE, the heat exchanger 132 may be fluidly coupled with and disposed downstream from the pump 134 and upstream of the cooling tower 136. As further illustrated in the FIGURE, the cooling tower 136 may be fluidly coupled with and disposed downstream from the heat exchanger 132 and upstream of the pump 134. In one or more embodiments, in addition to or in place of the cooling tower 136, the heat rejection system 128 may include once-through cooling utilizing sea or fresh water, a water-to-air heat exchanger, a water-to-water heat exchanger, where the secondary coolant is sea or fresh water, or air cooling utilizing a blower to flow atmospheric air through the heat exchanger 132. As configured, the heat exchanger 132 may transfer thermal energy from the first working fluid flowing therethrough to the cooling fluid circulating in the heat rejection system 128. Accordingly, the heat rejection system 128 may extract or remove thermal energy from the charging circuit of the PHES system 100.

As illustrated in the FIGURE, the turbine 112 may be fluidly coupled with and disposed downstream from the heat rejection system 128 in the charging circuit and upstream of the thermal storage vessel 102. The turbine 112 may be configured to receive the first working fluid from the heat rejection system 128 via line 138, expand the first working fluid, and direct the expanded first working fluid to the thermal storage vessel 102 via line 140. The expansion of the first working fluid through the turbine 112 may produce mechanical energy. For example, the turbine 112 may be configured to convert a pressure drop from the expansion of the first working fluid to mechanical energy. At least a portion of the mechanical energy produced by the turbine may be utilized to drive the compressor 110.

The thermal storage vessel 102 may be fluidly coupled with and disposed downstream from the turbine 112 and upstream of and fluidly coupled with the compressor 110. Accordingly, the expanded first working fluid discharged from the turbine 112 may be directed to the thermal storage vessel 102 via line 140. The heat exchanger 122 of the thermal storage system thermally coupled to the thermal storage vessel 102 may be configured to receive the expanded first working fluid and cool the particulate media stored in the thermal storage vessel 102 while heating the expanded first working fluid. As shown in the FIGURE, the compressor 110 may be fluidly coupled with and disposed downstream from the thermal storage vessel 102 of the thermal storage system via line 116. As disclosed above, the compressor 110 may be configured to receive the first working fluid from the thermal storage vessel 102 via line 116, compress the working fluid, thereby increasing the thermal energy thereof, and direct the compressed first working fluid to the thermal storage vessel 104 via line 118 to store additional thermal energy in the particulate media contained therein.

Turning now to the discharging circuit, as disclosed above, the discharging circuit may be configured to extract the thermal energy from the thermal storage vessels 102, 104 and convert the thermal energy from the thermal storage vessels 102, 104 to electrical energy via the second working fluid. To that end, the discharging circuit may include a heat engine 142 including a rotary component such as, for example, a compressor 144, and an expansion element such as, for example, a turbine 146. The heat engine 142 may be operatively coupled to a generator 148 and configured to provide mechanical energy to the generator 148. The generator 148 may be configured to convert the mechanical energy to electrical energy. Accordingly, in one or more embodiments, the generator 148 may be coupled to and configured to supply electrical energy to an electrical power grid. In another embodiment, the generator 148 may be electrically coupled to one or more process components of the PHES system 100 capable of utilizing the electrical energy generated.

As illustrated in the FIGURE, the generator 148 may be operatively coupled to the compressor 144 and the turbine 146 via a common shaft 150. In another embodiment, the generator 148 may be operatively coupled with the compressor 144 and the turbine 146 via respective shafts. In embodiments including multiple shafts, two or more of the shafts may be coupled with one another via a gearbox (not shown) including a plurality of gears, such that the coupled shafts may spin at the same speed, substantially similar speeds, or differing speeds and rotational directions. In at least one embodiment, the heat engine 142 may include a second turbine (not shown) where the turbines may be in series or parallel arrangement in order to achieve a power balance.

The compressor 144 may be disposed in the discharging circuit upstream of the thermal storage vessel 104 and downstream of the thermal storage vessel 102. The compressor 144 may be configured to utilize mechanical energy from the turbine 146 to compress the second working fluid flowing therethrough to increase the pressure and thermal energy or heat (e.g., heat of compression) of the second working fluid. The compressor 144 may be further configured to discharge the compressed second working fluid to the thermal storage vessel 104 via line 152.

As disclosed above, the thermal storage vessel 104 may contain at least a portion of the stored thermal energy generated in the charging circuit. Accordingly, in the discharging circuit, the heat exchanger 126 of the thermal storage system may transfer heat from the particulate media contained in the thermal storage vessel 104 to the second working fluid, thereby cooling the particulate media in the thermals storage vessel 104 and heating the compressed second working fluid flowing therethrough. As configured, the second working fluid may extract thermal energy stored in the thermal storage vessel 104 for use in the production of mechanical energy and electrical energy.

The turbine 146 may be fluidly coupled with and disposed downstream from the thermal storage vessel 104 of the thermal storage system via line 154. The turbine 146 may be configured to receive the compressed and heated second working fluid from the thermal storage vessel 104 via line 154 and expand the second working fluid. The expansion of the second working fluid through the turbine 146 may produce mechanical energy. For example, the turbine 146 may be configured to convert a pressure drop from the expansion of the second working fluid to mechanical energy. At least a portion of the mechanical energy produced by the turbine 146 may be utilized to drive the compressor 144 and/or the generator 148.

As shown in the FIGURE, the discharging circuit may also include a heat rejection system 156 fluidly coupled with and disposed downstream from the turbine 146 and upstream of and fluidly coupled with the thermal storage vessel 102. Accordingly, the heat rejection system 156 may be configured to receive the second working fluid discharged from the turbine 146 via line 158. The heat rejection system 156 may include a heat exchanger 160, a pump 162, and a cooling fluid source, such as, for example, a cooling tower 164, fluidly coupled with one another via a cooling fluid. For example, as illustrated in the FIGURE, the heat exchanger 160 may be fluidly coupled with and disposed downstream from the pump 162 and upstream of the cooling tower 164.

As further illustrated in the FIGURE, the cooling tower 164 may be fluidly coupled with and disposed downstream from the heat exchanger 160 and upstream of the pump 162. In one or more embodiments, in addition to or in place of the cooling tower 164, the heat rejection system 156 may include once-through cooling utilizing sea or fresh water, a water-to-air heat exchanger, a water-to-water heat exchanger, where the secondary coolant is sea or fresh water, or air cooling utilizing a blower to flow atmospheric air through the heat exchanger 160. As configured, the heat exchanger 160 may transfer thermal energy from the second working fluid flowing therethrough to the cooling fluid circulating in the heat rejection system 156. Accordingly, the heat rejection system 156 may extract or remove thermal energy from the discharging circuit of the PHES system 100.

The discharging circuit may further include the thermal storage vessel 102 being positioned downstream from and fluidly coupled with the heat rejection system 156 and upstream of and fluidly coupled with the compressor 144. The heat exchanger 124 of the thermal storage vessel 102 may receive the second working fluid discharged from the heat rejection system via line 166 and may transfer heat to the particulate media from the second working fluid, thereby heating the particulate media and cooling the second working fluid. The cooled second working fluid may be discharged from the thermal storage vessel 102 and directed to the compressor 144 via line 168.

As disclosed above, the charging circuit may be configured to convert electrical energy to thermal energy, and the discharging circuit may be configured to convert the thermal energy to electrical energy. In at least one embodiment, the charging circuit and the discharging circuit may be operated in conjunction or concurrently with one another. In another embodiment, the charging circuit and the discharging circuit may be operated separately or in sequence with one another.

Turning now to an exemplary operation of the charging circuit, the driver 106 may utilize electrical energy to drive the compressor 110. The compressor 110 may compress the first working fluid (e.g., argon) to generate thermal energy (e.g., heat of compression), thereby increasing the temperature and pressure of the first working fluid. The compressed first working fluid may be directed from the compressor 110 to the heat exchanger 120 of the thermal storage vessel 104 via line 118. The heat exchanger 120 may transfer thermal energy from the compressed working fluid to the particulate media contained therein to thereby cool the compressed first working fluid and heat the particulate media. The heated particulate media may retain the thermal energy, thereby allowing for storage of the thermal energy in the thermal storage vessel 104.

The compressed, cooled first working fluid discharged from the heat exchanger 120 and the thermal storage vessel 104 may be directed to the heat exchanger 132 of the heat rejection system 128 via line 130. The compressed, cooled first working fluid may be further cooled via the transfer of thermal energy of the cooling fluid flowing through the heat exchanger 132. The cooling fluid containing the thermal energy from the heat exchanger 132 may then be directed to the cooling tower 136 where the thermal energy may be exhausted from the PHES system 100. As such, additional thermal energy may be removed from the charging circuit via the heat rejection system 128.

The compressed, further cooled first working fluid may be directed to the turbine 112 via line 138. The turbine 112 may expand the working fluid to thereby decrease the temperature and the pressure of the compressed, further cooled first working fluid flowing therethrough. The expanded first working fluid may be directed from the turbine 112 to the heat exchanger 122 of the thermal storage vessel 102 via line 140. The heat exchanger 122 may allow for the transfer of thermal energy to the expanded first working fluid from the particulate media contained therein to thereby heat the expanded first working fluid and cool the particulate media. The heated first working fluid discharged from the heat exchanger 122 and the thermal storage vessel 102 may be directed to the compressor 110 via line 116.

Referring now to an exemplary operation of the discharging circuit, a compressed second working fluid (e.g., argon) may be discharged from the compressor 144 and directed to the heat exchanger 126 thermally coupled with the thermal storage vessel 104 via line 152. The heat exchanger 126 may transfer thermal energy from the heated particulate media to the compressed second working fluid flowing therethrough to thereby cool the particulate media and heat the compressed second working fluid. The heated, compressed second working fluid discharged from the heat exchanger 126 and the thermal storage vessel 104 may be directed to the turbine 146 via line 154. The turbine 146 may expand the heated, compressed second working fluid to thereby decrease the temperature and pressure thereof. The expansion of the heated, compressed second working fluid through the turbine 146 may produce mechanical energy, which may be utilized to generate electrical energy in the generator 148.

The expanded working fluid may be directed from the turbine 146 to the heat exchanger 160 of the heat rejection system 156 via line 158. The expanded second working fluid may be further cooled via the transfer of thermal energy of the cooling fluid flowing through the heat exchanger 160. The cooling fluid containing the thermal energy from the heat exchanger 160 may then be directed to the cooling tower 164 where the thermal energy may be exhausted from the PHES system 100. As such, additional thermal energy may be removed from the discharging circuit via the heat rejection system 158.

The cooled, expanded second working fluid may be directed to the heat exchanger 124 of the thermal storage vessel 102 via line 166. The heat exchanger 124 may transfer thermal energy from the cooled, expanded second working fluid to the particulate media to thereby heat the particulate media and further cool the cooled, expanded second working fluid. The further cooled, expanded second working fluid may be discharged from the heat exchanger 124 and the thermal storage vessel 102 and directed to the compressor 144 via line 168.

As disclosed herein, the PHES system 100 includes a heat rejection system 128 in the charging circuit and a heat rejection system 156 in the discharging circuit. Accordingly, the PHES system 100 may balance (e.g., divide, split) the total heat rejection duty between the charging circuit and the discharging circuit, resulting in certain advantages over conventional PHES systems. In an idealized case, the split of the total heat rejection duty between the charging circuit and the discharging circuit would be 50/50 within a certain tolerance. However, there may be practical considerations where such split may be tailored based on the needs of a given application. One non-limiting example may be environmental considerations—in the case of thermal storage in a solar plant application—, such as may involve relatively hot temperatures during day time and relatively cold temperatures during night time, where the split may be biased to account for such environmental conditions. For instance, the pressure ratios at which the charging circuit and the discharging circuit operate may be much closer, leading to matching of the operating pressures between the charging circuit and discharging circuit. This, in turn, may lead to an identical or substantially similar heat transfer vs. temperature characteristic between the charging circuit and the discharging circuit, which in turn minimizes the necessary temperature differentials in the transfer of heat in the respective circuits, which then leads to the maximum overall efficiency of the PHES system 100.

In addition, by splitting the heat rejection duty between the charging circuit and the discharging circuit, the size of the heat rejection system components (e.g. cooling tower, cooling water pumps, etc.) may be reduced. For example, in instances in which concurrent operation of the charging and discharging circuits is not necessary, the size of the components of the heat rejection system(s) 128 and 156 may only be half. In some embodiments, each of the heat rejection systems 128 and 156 may share a common pump and a common cooling tower, where each of heat exchangers 132 and 160 may operate in parallel with respect to sharing a common pump and cooling tower. A control system utilizing a plurality of valves may be incorporated in such a PHES system to allow the common pump and the common cooling tower to be approximately half the capacity as long as the duty is not concurrent.

Further, even in instances in which the charging circuit and discharging circuit are concurrently operating, one circuit (e.g., the charging circuit) may operate at full load while the other segment (e.g., the discharging circuit) operates at part load, such that the size of the components of the heat rejection systems 128 and 156 is between 50% and 100% of the size that would be required if the heat rejection were taken only from one circuit of the system. Such operation allows the PHES system 100 to provide valuable ancillary services products. The design basis for the heat rejection systems 128 and 156 may depend on the strategy of the operator with regard to the sizing of the charging and discharging circuit and the operating strategy for the PHES system 100.

As previously discussed, each of the charging circuit and/or the discharging circuit may be closed circuits or systems. As such, a mass or inventory of the working fluid and/or a base pressure of the working fluid contained in each of the charging circuit and/or the discharging circuit may remain the same. Accordingly, the power consumed in the charging circuit and the power generated or produced in the discharging circuit may not be changed. In at least one embodiment, the PHES systems 100 may include an inventory system (not shown) configured to add and/or remove at least a portion of the working fluid circulating in the charging circuit and/or the discharging circuit. It should be appreciated that removing a mass or portion of the working fluid from the charging circuit and/or the discharging circuit may decrease the base pressure thereof, thereby decreasing the power consumed and generated therein. It should also be appreciated that adding a mass or portion of the working fluid from the charging circuit and/or the discharging circuit may increase the base pressure thereof, thereby increasing the power consumed and generated therein. Therefore, by controlling the base pressure of the charging circuit and/or the discharging circuit, the rate at which energy is absorbed or delivered respectively is controlled in direct proportion.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions and alterations herein without departing from the scope of the present disclosure.

What is claimed is:

1. A pumped heat energy storage system, comprising:
  a charging circuit comprising:
    a first compressor configured to compress a first working fluid and generate thermal energy;
    a plurality of thermal storage vessels fluidly coupled with the first compressor and configured to store the thermal energy generated from the first compressor; and
    a first heat rejection system fluidly coupled with the plurality of thermal storage vessels and configured to remove thermal energy from the charging circuit; and
  a discharging circuit comprising:
    a first turbine fluidly coupled with the plurality of thermal storage vessels and configured to extract the thermal energy stored in the plurality of thermal storage vessels and convert the thermal energy to mechanical energy via an expansion of a second working fluid;

a generator operatively coupled to the first turbine and configured to convert the mechanical energy to electrical energy; and a second heat rejection system fluidly coupled with the plurality of thermal storage vessels and the first turbine and configured to remove thermal energy from the discharging circuit, wherein the first heat rejection system and the second heat rejection system are configured to balance a total heat rejection of the pumped heat energy storage system between the charging circuit and the discharging circuit.

2. The pumped heat energy storage system of claim 1, wherein the charging circuit further comprises:

a motor operatively coupled to the first compressor and configured to drive the first compressor; and a second turbine operatively coupled to the motor and the first compressor.

3. The pumped heat energy storage system of claim 2, wherein the first compressor, the motor, and the second turbine are operatively coupled via a common rotary shaft.

4. The pumped heat energy storage system of claim 2, wherein the discharging circuit further comprises a second compressor operatively coupled to the generator and the first turbine.

5. The pumped heat energy storage system of claim 4, wherein the first turbine, the generator, and the second compressor are operatively coupled via a common rotary shaft.

6. The pumped heat energy storage system of claim 4, wherein the plurality of thermal storage vessels comprises:

a first thermal storage vessel configured to receive the first working fluid discharged from the first compressor and the second working fluid discharged from the second compressor; and a second thermal storage vessel configured to discharge the first working fluid to the first compressor and the second working fluid to the second compressor.

7. The pumped heat energy storage system of claim 6, wherein:

the first heat rejection system fluidly couples the first thermal storage vessel and the second turbine and is configured to remove thermal energy from the first working fluid flowing therethrough; and the second heat rejection system fluidly couples the second thermal storage vessel and the first turbine and is configured to remove thermal energy from the second working fluid flowing therethrough.

8. The pumped heat energy storage system of claim 7, wherein:

the first heat rejection system comprises a first heat exchanger configured to receive a first cooling fluid from a first cooling fluid source, such that the thermal energy from the first working fluid is transferred to the first cooling fluid; and the second heat rejection system comprises a second heat exchanger configured to receive a second cooling fluid from a second cooling fluid source, such that the thermal energy from the second working fluid is transferred to the second cooling fluid.

9. The pumped heat energy storage system of claim 8, wherein:

the first heat rejection system further comprises a first pump fluidly coupled with and disposed upstream of the first heat exchanger, the first pump being configured to circulate the first cooling fluid to the first heat exchanger, and a first cooling tower fluidly coupled with and disposed downstream from the first heat exchanger and upstream of the first pump; and the second heat rejection system further comprises a second pump fluidly coupled with and disposed upstream of the second heat exchanger, the second pump being configured to circulate the second cooling fluid to the second heat exchanger, and a second cooling tower fluidly coupled with and disposed downstream from the second heat exchanger and upstream of the second pump.

10. The pumped heat energy storage system of claim 1, wherein the charging circuit operates at a first pressure ratio, and the discharging circuit operates at a second pressure ration, the first pressure ratio and the second pressure ratio being substantially similar.

11. A pumped heat energy storage system, comprising:

an electric motor configured to be driven by an electrical power supply;

a first closed loop configured to circulate a first working fluid, the first closed loop comprising:

a first rotary component operatively coupled to the electric motor and configured to generate a thermal energy of the first working fluid;

a plurality of thermal storage vessels configured to receive the first working fluid and to store the thermal energy generated; and a first heat exchanger configured to receive the first working fluid from a first thermal storage vessel of the plurality of thermal storage vessels and to remove thermal energy from the first working fluid and the first closed loop;

a second closed loop configured to circulate a second working fluid, the second closed loop comprising:

a first expansion element fluidly coupled to the first thermal storage vessel and configured to extract the thermal energy stored therein via the second working fluid and to convert the extracted thermal energy to mechanical energy; and a second heat exchanger configured to receive the second working fluid discharged from the first expansion element and to remove thermal energy from the second working fluid and the second closed loop; and a generator operatively coupled to the first expansion element and configured to convert at least a portion of the mechanical energy to electrical energy, wherein the first heat exchanger and the second heat exchanger are configured to balance a total heat rejection of the pumped heat energy storage system between the first closed loop and the second closed loop.

12. The pumped heat energy storage system of claim 11, wherein the first closed loop further comprises:

a second expansion element fluidly coupling the first heat exchanger and a second thermal storage vessel of the plurality of thermal storage vessels, the second expansion element configured to expand the first working fluid discharged from the first heat exchanger.

13. The pumped heat energy storage system of claim 12, wherein the second closed loop further comprises:

a second rotary component fluidly coupling the first thermal storage vessel and the second thermal storage vessel, the second rotary component configured to pressurize the second working fluid discharged from the second thermal storage vessel prior to the second working fluid entering the first thermal storage vessel.

14. The pumped heat energy storage system of claim 13, further comprising:
a first heat rejection system comprising
the first heat exchanger;
a first pump fluidly coupled with and disposed upstream of the first heat exchanger, the first pump being configured to circulate a first cooling fluid from a first cooling fluid source to the first heat exchanger, such that thermal energy is transferred from the first working fluid to the first cooling fluid, and
a first cooling tower fluidly coupled with and disposed downstream from the first heat exchanger and upstream of the first pump; and
a second heat rejection system further comprising
the second heat exchanger;
a second pump fluidly coupled with and disposed upstream of the second heat exchanger, the second pump being configured to circulate a second cooling fluid from a second cooling fluid source to the second heat exchanger, such that thermal energy is transferred from the second working fluid to the second cooling fluid, and
a second cooling tower fluidly coupled with and disposed downstream from the second heat exchanger and upstream of the second pump.

15. The pumped heat energy storage system of claim 13, wherein the first thermal storage vessel is configured to store more thermal energy than the second thermal storage vessel, and the first thermal storage vessel is configured to operate at a greater pressure than the second thermal storage vessel.

16. The pumped heat energy storage system of claim 13, wherein:
the first rotary component, the electric motor, and the second expansion element are operatively coupled via a first common rotary shaft; and
the first expansion element, the generator, and the second rotary component are operatively coupled via a second common rotary shaft.

17. The pumped heat energy storage system of claim 11, wherein each thermal storage vessel of the plurality of thermal storage vessels includes a plurality of porous solid material layers, each porous solid material layer having a greater or lesser temperature than an adjacent porous solid material layer.

18. A pumped heat energy storage system, comprising:
a first working fluid circuit comprising:
an electric motor;
a heat pump configured to be driven by the electric motor and to generate thermal energy;
a thermal storage system configured to receive the thermal energy generated from the heat pump via a working fluid and to store the thermal energy; and
a first heat rejection system fluidly coupled with the thermal storage system and configured to remove thermal energy from the first working fluid circuit; and
a second working fluid circuit comprising
a heat engine configured to extract thermal energy from the thermal storage system and to convert at least a portion of the thermal energy extracted from the thermal storage system to mechanical energy;
a generator configured to convert at least a portion of the mechanical energy to electrical energy; and
a second heat rejection system fluidly coupled with the thermal storage system and configured to remove thermal energy from the second working fluid circuit,
wherein the first heat rejection system and the second heat rejection system are configured to balance a total heat rejection of the pumped heat energy storage system between the first working fluid circuit and the second working fluid circuit.

19. The pumped heat energy storage system of claim 18, wherein:
the heat pump comprises a first compressor and a first turbine operatively coupled with the electric motor on a first common rotary shaft; and
the heat engine comprises a second compressor and a second turbine operatively coupled with the generator on a second common rotary shaft.

20. The pumped heat energy storage system of claim 19, wherein:
the first heat rejection system comprises
a first heat exchanger fluidly coupling the first turbine and a first thermal storage vessel of the thermal storage system;
a first pump fluidly coupled with and disposed upstream of the first heat exchanger, the first pump being configured to circulate a first cooling fluid to the first heat exchanger; and
a first cooling tower fluidly coupled with and disposed downstream from the first heat exchanger and upstream of the first pump; and
the second heat rejection system comprises
a second heat exchanger fluidly coupling a second thermal storage vessel of the thermal storage system and the second turbine;
a second pump fluidly coupled with and disposed upstream of the second heat exchanger, the second pump being configured to circulate a second cooling fluid to the second heat exchanger; and
a second cooling tower fluidly coupled with and disposed downstream from the second heat exchanger and upstream of the second pump.

* * * * *